United States Patent
Cavalli et al.

(10) Patent No.: US 8,520,684 B2
(45) Date of Patent: Aug. 27, 2013

(54) METHOD FOR PACKET CLASSIFICATION BASED ON PROTOCOL TYPE AND ON PRIORITIES

(75) Inventors: Giulio Cavalli, Milan (IT); Claudio Santacesaria, Milan (IT)

(73) Assignee: Nokia Siemens Networks S.p.A., Cassina de Pecchi, (MI) (IT)

( * ) Notice: Subject to any disclaimer, the term of this patent is extended or adjusted under 35 U.S.C. 154(b) by 719 days.

(21) Appl. No.: 12/308,398

(22) PCT Filed: Jun. 14, 2007

(86) PCT No.: PCT/EP2007/005264
§ 371 (c)(1),
(2), (4) Date: Jul. 8, 2010

(87) PCT Pub. No.: WO2007/144179
PCT Pub. Date: Dec. 21, 2007

(65) Prior Publication Data
US 2010/0284378 A1   Nov. 11, 2010

(30) Foreign Application Priority Data
Jun. 15, 2006 (EP) .................................. 06425406

(51) Int. Cl.
*H04L 12/56* (2011.01)
(52) U.S. Cl.
USPC ... 370/395.42; 370/328; 370/349; 370/395.4; 370/395.41; 370/395.43; 455/422.1; 455/512
(58) Field of Classification Search
USPC ............... 370/310.2, 328–339, 349, 395.4, 370/395.41, 395.42, 395.43; 455/422.1, 455/512
See application file for complete search history.

(56) References Cited

U.S. PATENT DOCUMENTS 6,167,445 A * 12/2000 Gai et al. ...................... 709/223
2002/0196796 A1 12/2002 Ambe et al.
(Continued)

FOREIGN PATENT DOCUMENTS

RU   2 263 415 C2   10/2005
WO   00/41368        7/2000
(Continued)

OTHER PUBLICATIONS

International Search Report for Application No. PCT/EP2007/005264; mailed Oct. 8, 2007.
"802.16™ IEEE Standard for Local and metropolitan area networks, Part 16: Air Interface for Fixed Broadband Wireless Access Systems" (IEEE Std 802.16™ -2004); IEEE Computer Society and the IEEE Microwave Theory and Techniques Society, Oct. 2004, pp. 1-857.

*Primary Examiner* — Hoon J Chung
(74) *Attorney, Agent, or Firm* — Staas & Halsey LLP

(57) ABSTRACT

External packets entering a transmitting entity of a broadband wireless access system are forwarded to a receiving entity onto MAC layer connections at the wireless interface between such entities in a manner depending on the result of a packet classification performed by using a set of classification rules identified by a rule index and associated with a priority index determining the order of application of different rules to packets relating to a same service. The classification rules include both classification rules specific for data communication protocols and containing one or more protocol-specific parameters to be matched by corresponding fields in a packet being classified, and a pass-through classification rule only containing a priority index and a rule index, but no protocol-specific matching parameter, said pass through classification rule being applied to a packet not having matched a protocol-specific classification rule.

16 Claims, 2 Drawing Sheets

(56) References Cited

U.S. PATENT DOCUMENTS

2004/0177139 A1 9/2004 Schuba et al.
2005/0265398 A1 12/2005 Chapman et al.
2007/0064604 A1* 3/2007 Chen et al. .................. 370/230

FOREIGN PATENT DOCUMENTS

| WO | 01/30103 A1 | 4/2001 |
| WO | 03/028304 A1 | 4/2003 |
| WO | 03/069849 A1 | 8/2003 |

* cited by examiner

METHOD FOR PACKET CLASSIFICATION BASED ON PROTOCOL TYPE AND ON PRIORITIES

FIELD OF THE INVENTION

The present invention refers to broadband wireless access systems, in particular systems conforming to IEEE Standard 802.16, and more particularly it concerns a method of forwarding external packets onto MAC (Medium Access Control) layer connections at the air interface of one such system.

BACKGROUND OF THE INVENTION

IEEE Standard 802.16 defines a set of air interfaces (WirelessMan™ interfaces) for access systems supporting multimedia services, in order to provide access to buildings through exterior antennas communicating with a central base station. Wireless access is a cost-effective alternative to the conventional cabled access. The standard currently defines access specifications for both fixed and nomadic or mobile users, in case of mobility at vehicular speed.

The standard provides a common MAC layer protocol supporting a wide range of physical layer specifications. The IEEE standard MAC protocol has been designed especially for point to multipoint applications, in which each communication channel must accommodate a great number of terminals and each terminal in turn may be shared by multiple users requiring a wide variety of services and using a wide variety of transport protocols.

According to the standard, the data traffic related to a certain service flow is transported, between peer MAC layers in the base station and a terminal or subscriber station, on the so-called transport connections. Each connection is allotted to a single type of service so that several connections exist between a base station and a terminal or subscriber station to allow handling different type of services. Each connection is identified by a connection identifier that is in turn related with a service flow identifier, defining the Quality of Service (QoS) parameters of the service flow associated with that connection.

Within the MAC layer of a transmitting station, the so-called Service-Specific Convergence Sublayer provides for any transformation of external (higher-layer) protocol data units (PDUs) into the MAC service data units (SDUs) that are to be transported over a connection. The selection of the proper connection onto which a data unit will be transported is performed by the Service-Specific Convergence Sublayer through a classification operation, that is a check on whether certain protocol-specific parameters are matched in the data unit to be forwarded. Once classified, a PDU will be encapsulated into a MAC SDU and actually forwarded onto a connection.

Currently, convergence sublayer specifications are defined for both packets and ATM (Asynchronous Transfer Mode) cells, and the present invention is related with packet handling.

In the case of data packets, each classification rule generally defines a set of parameters that are to be matched by the values of specific fields of a packet. Moreover, a classification rule is associated with a priority index, defining the order in which the different classification rules concerning a same service flow are to be applied. When there is a packet to be transmitted, the classification rules are applied to it, starting from the one with higher priority. If all parameters listed in a classification rule match the associated packet fields, the packet is forwarded using the connection associated to the classification rule. If a packet fails to match any classification rule, the convergence sublayer shall discard it.

The standard currently defines a certain number of parameters, but a classification rule needs not to contain all of the parameters defined for the relevant protocol. In this respect, the standard specifies that, if a parameter is omitted in a classification rule, the comparison of the associated field of the packet is irrelevant.

However, in case of subscriber and base stations operating in environments such as a LAN (local Area Network), a problem arises. The standard defines classification rules for traffic packets of data transmission protocols, and mentions, as examples, Internet protocol, Point-to-Point protocol, and Ethernet protocol. In a LAN environment, two entities involved in a communication mutually exchange, besides traffic packets, network control and management packets, which may belong to many different protocols. An example could be the packets relevant to the automatic dialogue between two personal computers that must become connected in order to exchange data. Those network control and management packets are indispensable to permit communication between the two entities, and therefore they too have to be forwarded over a connection established between the two entities at the air interface. The flow of such network control and management packets is completely transparent to the operator that has defined the connections and the classification rules, and such packets generally will not match any data classification rule. Moreover, such packets will not be recognised as MAC management packets to be forwarded on a management connection. Thus, unless some measure is taken, the risk exists that the MAC layer of a LAN entity, when receiving such packets, does not forward them to the peer entity, thereby making communication impossible.

The person of ordinary skill in the art, when confronting with the problem, will consider that the standard requires that some classification rule is matched in order a packet can be forwarded on a connection, and thus he/she will be induced to define further classification rules, as many as are the possible values of a certain packet field. For instance, should the network control and management packet flow be based on an IP protocol, one could imagine that the Type of Service field in the IP packets identifies also those packet kinds and define a new classification rule for each type of service value. This is not a practical approach and, moreover, it does not work for non-IP packets.

By generalising such way of solving the problem, it could be said that the person of ordinary skill in the art, in order to obtain a classification rule that allows mapping also the network control and management packets onto the MAC layer connections, should define a matching parameter for each protocol. Again, apart from the bulk of work involved in such way of operation, it is almost impossible to know a priori all types of network control and management protocols that can be encountered.

SUMMARY OF THE INVENTION

The invention aims to solve this problem by performing packet classification with a set of classification rules that allows forwarding onto a connection even packets not belonging to a data communication or to MAC management messages.

According to the invention, this is obtained in that packet classification is performed by using a set of classification rules including protocol-specific classification rules, containing one or more protocol-specific parameters to be matched by corresponding fields in a packet being classified, and a pass-through classification rule containing only a priority index and a rule index, but no matching parameter.

Since, as said, according to the standard any parameter that is omitted in a classification rule is irrelevant, it is clear that any kind of packet will match a classification rule including no parameter. Thus, also network management and control packets will be forwarded on a connection.

Advantageously, the priority index of such a rule will be set to a low value, preferably a value lower than any other classification rule with which a data protocol packet is to be compared, in order to avoid that lower priority classification rules are never used. For instance, the pass-through classification rule is allotted a priority 0.

Moreover, the network control and management packets can be considered as belonging to a flow that does not require a high quality of service. Advantageously, therefore, packets meeting only the pass-through classification rule can be mapped onto a connection that is associated with the lowest quality type of service defined by the standard, i.e. the best effort type of service.

BRIEF DESCRIPTION OF THE DRAWINGS

Further objects, characteristics and advantages of the invention will become apparent from the following description of a preferred embodiment, given by way of non-limiting example and illustrated in the accompanying drawings, in which.

DESCRIPTION OF THE PREFERRED EMBODIMENTS

Figure 1:
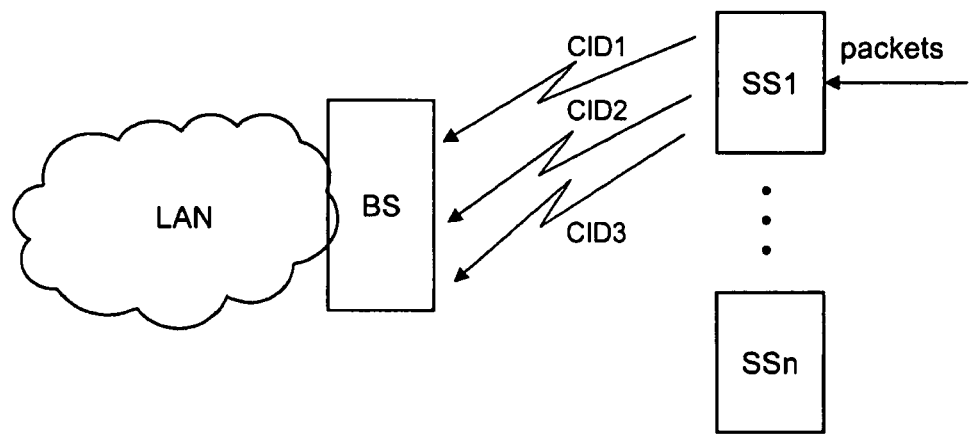
FIG. 1 is a schematic block diagram of a wireless access system in which the invention is employed.

Referring to FIG. 1, there is schematically shown the architecture of a wireless access system, with a number of subscriber stations SS1 . . . SSn having a radio access to a radio base station BS for exchanging data in packet form. The system is to operate in a LAN environment, as schematically illustrated by block LAN associated with base station BS.

As said in the introduction of the specification, data units are transported from the subscriber stations to the base station and vice versa on unidirectional connections, each allotted to a service having a specific requirement in term of quality of service (QoS). The characteristics of the different types of services envisaged by that IEEE Standard 802.16 (namely, Unsolicited Grant Service, Real-time Polling Service, Non-real-time Polling Service and Best Effort, in decreasing order of QoS requirements) are not of interest for the present invention.

For sake of simplicity, the drawing only shows three uplink connections, identified by connection identifiers (CIDs) 1, 2, 3, for data transport from subscriber station SS1 to base station BS. Of course, also downlink connections will be set up between base station BS and subscriber station SS1 and similar uplink and downlink connections will exist for data transport between the base station and the other subscriber stations.

With reference to the illustrated example, the packets entering subscriber station SS1 are to be forwarded on a proper connection based on the result of a classification process. According to the invention, the classification process is performed so as to allow forwarding onto one of connections CID1, CID2, CID3 not only data packets, but also network control and management packets.

Figure 2:
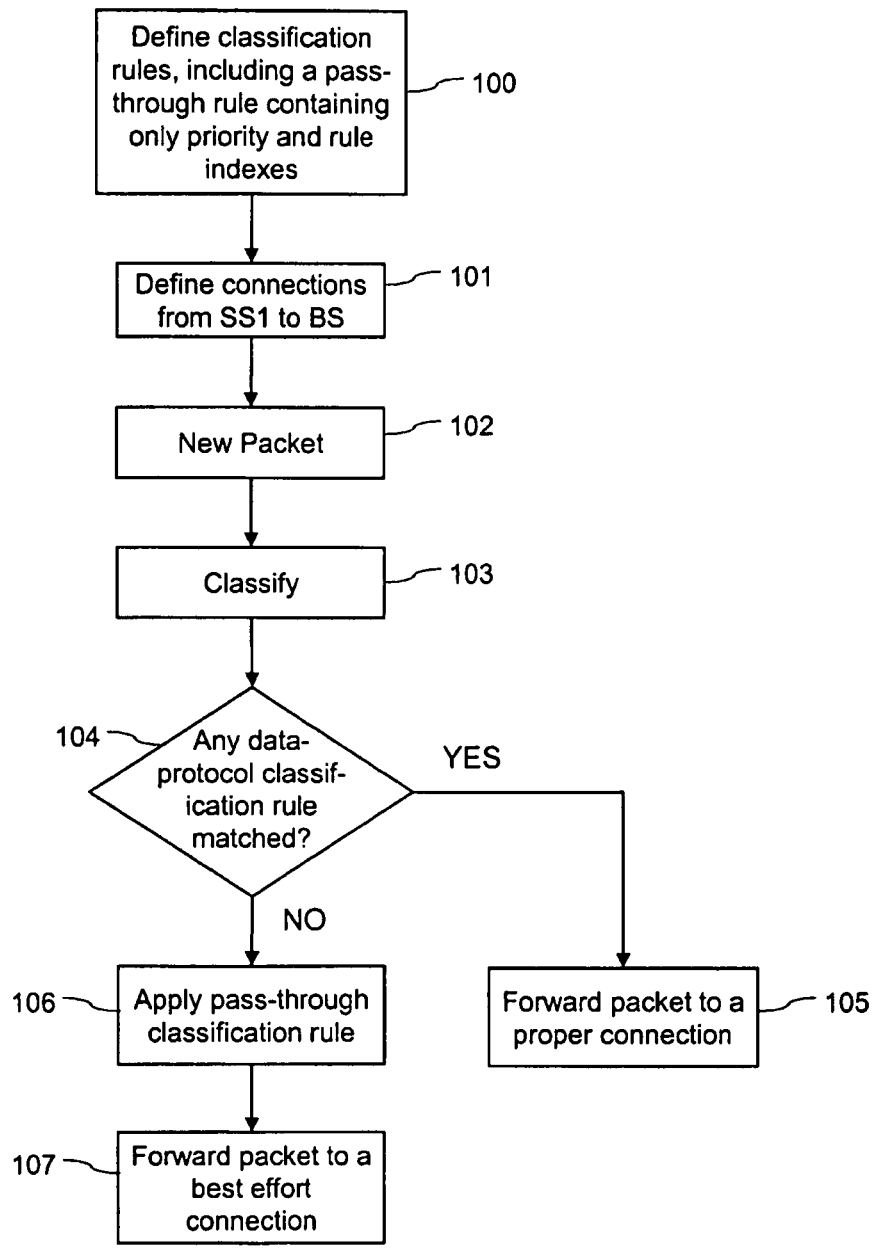
FIG. 2 is a flow chart of the method according to the invention.

FIG. 2 shows in more detail the forwarding procedure in a system employing the invention.

In a configuration phase of the system, the operator defines (step 100) the protocol-specific classification rules for the various data communication protocols the system can accommodate, as well as a pass-through classification rule intended to permit classification, and hence forwarding onto a connection, also of the above-mentioned network control and management packets. The inclusion of such pass-through classification rule is the idea upon which the invention is based.

The pass-through classification rule is a rule in which only a priority index and a rule index are present, whereas no criterion to be matched in order a packet can be forwarded to a connection is included. Since, according to the standard, any parameter that is omitted in a classification rule is irrelevant, it is clear that any kind of packet will match a classification rule including no parameter.

The pass-through classification is preferably associated with a service flow identifier indicating that a low quality of service is admitted, and is advantageously allotted a priority index lower than the priority indexes allotted to the protocol-specific classification rules for the data packets. Thus, also low priority protocol-specific rules can be applied before the pass-through classification rule and forwarding of data packets onto a connection associated with too a low quality of service is avoided.

After the definition of the classification rules, in a planning phase, the proper number of connections is allotted to subscriber station SS1 (FIG. 1) and the associations between connections and types of services are defined (step 101).

During system operation, whenever a new packet arrives (step 102), the MAC convergence sublayer of SS1 starts classifying it (step 103), beginning with the highest priority rule. In case of a data packet, a protocol-specific rule will generally be matched (output YES of step 104) and the packet will be forwarded to the connection determined by the classification result (step 105).

On the contrary, a network control and management packet will generally not match any protocol-specific classification rule (output NO of step 104), so that the pass-through classification rule is applied to such packet (step 106) and results in forwarding the packet onto a connection allotted to a low quality of service, such as a best effort connection (step 107).

It is evident that the above description has been given by way of non-limiting example and that changes and modifications are possible without departing from the scope of the invention.

The invention claimed is:

1. A method of forwarding external packets onto connections at a medium access control layer between two communicating entities at the wireless interface of a broadband wireless access system, comprising:

classifying the external packets at the medium access control layer to obtain a classification result by using a set of classification rules identified by a rule index and associated with a priority index determining an order of application of different classification rules to the external packets relating to a same service, the set of classification rules including both protocol-specific classification rules, containing one or more protocol-specific parameters to be matched by corresponding fields in a packet being classified, and a pass-through classification rule only containing a priority index and a rule index, but no protocol-specific matching parameter; and forwarding the external packets based on the classification result.

2. The method as claimed in claim 1, wherein the pass-through classification rule has the priority index lower than the protocol-specific classification rules, for application to packets having not matched any of the protocol-specific classification rules.

3. The method as claimed in claim 2, wherein the pass-through classification rule has priority 0.

4. The method as claimed in claim 3, wherein pass-through packets matching only the pass-through classification rule are forwarded onto connections associated with services characterized by a low quality of service.

5. The method as claimed in claim 4, wherein the pass-through packets are forwarded onto connections associated with a best effort type of service.

6. The method as claimed in claim 5, wherein the two communicating entities operate in a local area network environment.

7. The method as claimed in claim 4, wherein the two communicating entities operate in a local area network environment.

8. The method as claimed in claim 3, wherein the two communicating entities operate in a local area network environment.

9. The method as claimed in claim 2, wherein pass-through packets matching only the pass-through classification rule are forwarded onto connections associated with services characterized by a low quality of service.

10. The method as claimed in claim 9, wherein the pass-through packets are forwarded onto connections associated with a best effort type of service.

11. The method as claimed in claim 10, wherein the two communicating entities operate in a local area network environment.

12. The method as claimed in claim 9, wherein the two communicating entities operate in a local area network environment.

13. The method as claimed in claim 1, wherein pass-through packets matching only the pass-through classification rule are forwarded onto connections associated with services characterized by a low quality of service.

14. The method as claimed in claim 13, wherein the pass-through packets are forwarded onto connections associated with a best effort type of service.

15. The method as claimed in claim 14, wherein the two communicating entities operate in a local area network environment.

16. The method as claimed in claim 13, wherein the two communicating entities operate in a local area network environment.

* * * * *